United States Patent
Mitchell

(10) Patent No.: US 7,142,518 B2
(45) Date of Patent: Nov. 28, 2006

(54) MONITORING COMMUNICATIONS NETWORKS

(75) Inventor: Kevin Mitchell, Edinburgh (GB)

(73) Assignee: Agilent Technologies, Inc., Palo Alto, CA (US)

( * ) Notice: Subject to any disclaimer, the term of this patent is extended or adjusted under 35 U.S.C. 154(b) by 1044 days.

(21) Appl. No.: 10/192,421

(22) Filed: Jul. 10, 2002

(65) Prior Publication Data

US 2003/0043755 A1    Mar. 6, 2003

(30) Foreign Application Priority Data

Sep. 3, 2001   (EP)   ................................. 01307491

(51) Int. Cl.
*H04B 3/20*   (2006.01)

(52) U.S. Cl. ...................................... 370/290; 370/390

(58) Field of Classification Search ................ 370/389, 370/401, 402, 312, 386, 390, 428, 465, 290, 370/400
See application file for complete search history.

(56) References Cited

U.S. PATENT DOCUMENTS 6,331,983 B1 * 12/2001 Haggerty et al. ........... 370/400
6,778,531 B1 * 8/2004 Kodialam et al. .......... 370/390

FOREIGN PATENT DOCUMENTS

EP    0 477 448 A1   1/1992
WO    WO 00/31929    2/2000

OTHER PUBLICATIONS

Cichra, M., Examiner. European Search Report, Application No. EP 01 30 7491, dated Feb. 6, 2002.
Neogi A. et al. "Performance Analysis of an RSVP-Capable Router." IEEE Network, New York, vol. 13, No. 5, Sep. 1999, pp. 56-63.
Viswanathan A. et al. "Evolution of Multiprotocol Label Switching." IEEE Communications Magazine, Piscataway, N.J., vol. 36, No. 5, May 1, 1998, pp. 165-173.

* cited by examiner

*Primary Examiner*—Brenda Pham

(57) ABSTRACT

Selected data (LSP1, LSP2) is monitored among other data passing through label switched paths (LSPs) of a communications network of interconnected label switching routers (LSR–LSR4). The method comprises designating at least one of the routers (LSR3) as a monitoring station and at least one of the routers (here LSR3 also) as a probe interface station, and connecting a probe apparatus to that interface station. The monitoring station (LSR3) is configured to multicast forward the selected data for monitoring additionally to the probe apparatus via the probe interface (506). Also disclosed is a probe apparatus including means for configuring the router to perform multicast forwarding of selected data to the interface.

12 Claims, 4 Drawing Sheets

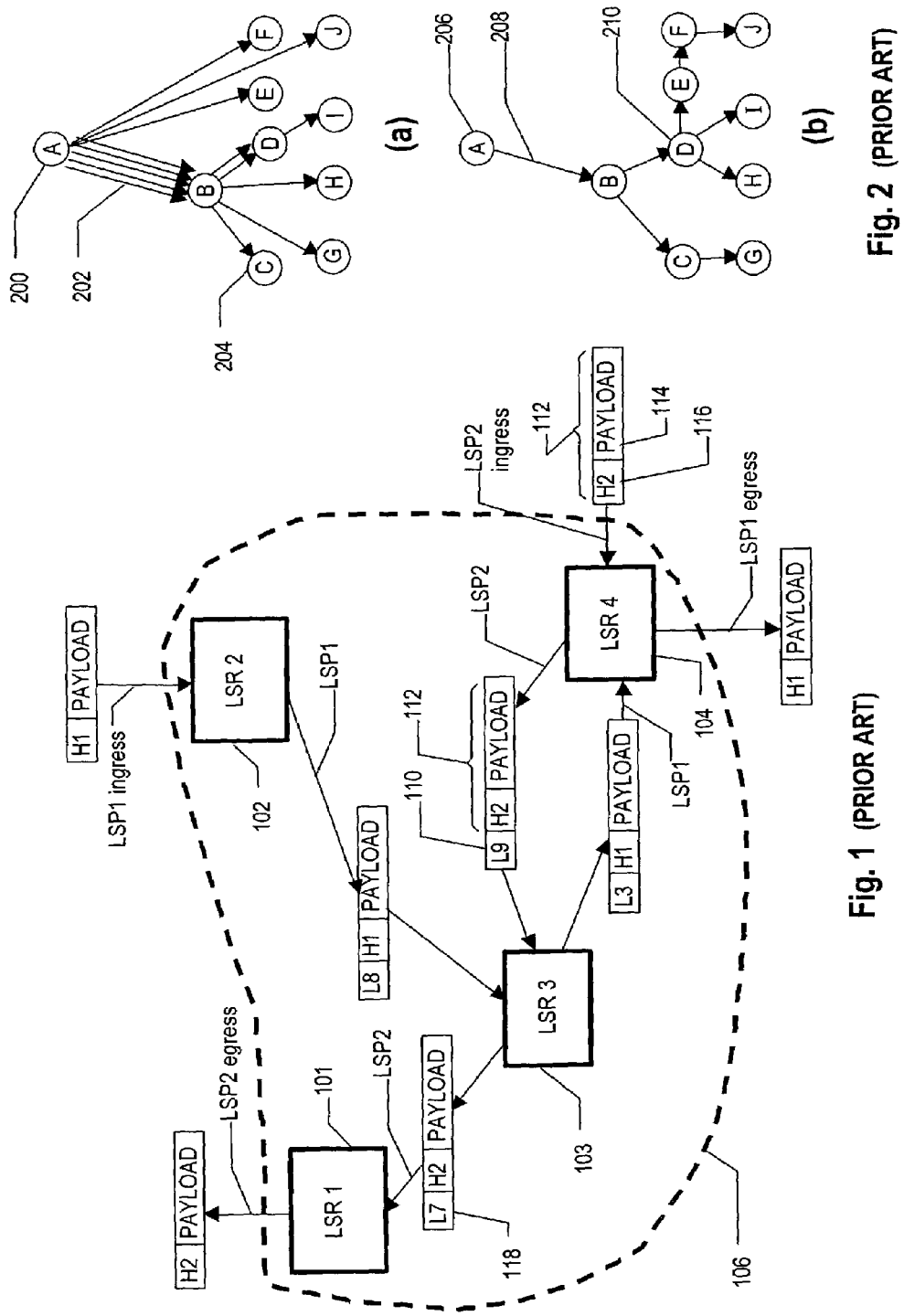

MONITORING COMMUNICATIONS NETWORKS

INTRODUCTION

The present invention relates to a method and apparatus for selectively monitoring data streams in a connection-oriented communications network. The invention may be deployed semi-permanently to achieve a continual overview of the state of the communications system, to meter traffic flow, or, in a trouble-shooting capacity, applied at specific locations to pinpoint points of failure.

A communications network is created by the connection of the transportation medium to all of the devices that access it by dedicated traffic management components. Traffic may have to flow through tens or even hundreds of such devices to reach its final destination. At a very simplistic level these network components predominantly comprise routers (which are "intelligent" versatile devices that ensure that the traffic flowing through them reach the next onward hop in an efficient and effective manner) and switches (which, although also managing traffic flow across the network, do not provide the rich set of features, protocols or interface types that routers do, but by not doing so achieve a higher throughput). There exist many different variants of such routers and switches, targeted towards specific data types, operations or performance.

It was very simple to monitor the flow of "traffic" down a line in the era of telecommunication when each line had its own dedicated physical interface, as all that was required was to physically "tap" the line of interest. As communications networks have evolved it has become increasingly difficult to achieve such simplistic monitoring, due to their complexity and scale. Modem high-capacity networks use routers and switches, which are characterised by their ability to route incoming data to a desired one of many out-going links. More advanced networks in which the present invention is intended to operate may use Label Switching Routers (LSRs), which route the data by reference to a "label" attached to each packet of the normal traffic data. Label switching can exist anywhere in the network, provided that it is supported by the appropriate hardware and software of the routing devices.

The term "label switching" is a generic one, not dependent on any particular protocol, referring to the method by which payload traffic is transported through the network. Label switched data is transported across the network on what is referred to as a label switched path (LSP) by a method known as label switched routing. Various forms of label switched routing exist, and the invention is not limited in its application to any particular standard. The technique known as Multi-Protocol Label Switching (MPLS) has been chosen as the specific example for this description. MPLS technology is described in detail in the book "MPLS: Technology and Applications" by Davie & Rekhter, ISBN 1-55860-656-4.

Currently, trouble-shooting and monitoring of a network for performance verification is achieved by the temporary deployment of probes which are attached to the network at specific nodes of interest. One known technique is to "tap" the signals in a physical link by means of an optical/electrical splitter, to obtain a signal for monitoring. A probe in that case must process all of the data on the physical link and operate at the link's maximum bandwidth, even if only a portion of that data is of interest. More significantly, the optical/electrical splitter inevitably takes power from the main signal, and requires disruption to the physical link.

A facility for less intrusive monitoring is built into some commercial routers, in the form of an extra physical output that can be configured within the router to replicate the data on any one of several outgoing links, avoiding signal loss on the optical link itself. One such example is CISCO Systems' "SPAN" port (Switched Port ANalyser). Again, however, the probe apparatus receiving the replicated signal must process all of the data on the physical link, and can only monitor data travelling on one link at a time.

It is an object of the invention to provide an alternative method for more flexible probing of one or more distinct network data streams conveyed in a distributed communications network, particularly one using label switching.

According to one aspect of the present invention there is provided a method for the monitoring of selected data among other data passing through label switched paths of a communications network, the network comprising a plurality of label switching routers, each router having a plurality of interfaces connected to other routers by means of physical links, each router being configured to forward incoming data packets toward respective destinations in the network by reference to labels received with said data packets, the method comprising:
  designating at least one of the routers as a monitoring station;
  designating at least one of the routers as a probe interface station, and designating as a probe interface an output interface of said router;
  connecting a probe apparatus to receive data from the probe interface;
  configuring the designated monitoring station by means of a multicast function within the router to forward the selected data additionally to the probe interface; and
  operating said probe apparatus so as to monitor the selected data as it is received from said probe interface.

At least some commercially available routers are provided with a "multi-cast" function, whereby different target destinations are considered equal priority and sent identical data by more efficient point to multipoint, rather than point-to-point protocols. This is designed for example to allow more efficient web broadcasts. The inventors have recognised that this multi-cast facility in a Label Switching Router can also be used to generate a copy of data travelling in an LSP, which can be used for many types of monitoring, without the need for physical taps, and without the disadvantages of having to monitor at the maximum speed of the interface or with other data being mixed in with the data of interest. The advantages provided using this method are that desired multiple label switched paths, carried on one or more physical links carrying other data not of interest, can be selectively monitored in a physically less intrusive manner.

A single router may serve as both monitoring station and probe interface station, which has the advantage that monitoring overhead in the network is minimised, and timing between the real data and the monitoring data is not too dissimilar. Alternatively, the monitoring station and probe interface station may be on separate routers. In this case, the data forwarded from the monitoring station must be routed through the network, and therefore represents an additional intrusion into the operation of the network. The user of the apparatus must determine whether the intrusion is so significant as to devalue the results of monitoring, or to disrupt the general operation of the network to an unacceptable degree.

The designated interface may be just one of many interfaces ordinarily provided on the router, rather than a port dedicated to monitoring at the time of manufacture.

The probe apparatus or other entity which instructs the router to establish the multicast forwarding need not know explicitly the label locally assigned to the data in question. The selected data may for example be designated by reference to a specific label switched path (LSP) identifier, the designated router then translating the LSP identifier to a specific incoming label to establish the multicasting.

The probe and router may be reconfigured automatically in response to LSP/tunnel association changes. Said automatic reconfiguration may be arranged via an alerting function established within the router. One mechanism which can be used to establish an alerting function is an MIB trap.

The designated router may be configured to forward selected data from plural sources to the same probe interface at the same time. By this step, provided the capacity of the designated interface is not exceeded, several LSPs, which may be conveyed upon different physical links, can be replicated and sent to the probe apparatus via a single physical probe interface.

The designated router may be configured to forward said data to the probe apparatus with different labels so as to distinguish between data from different sources.

The monitoring step may include aggregation of the data sent to the probe prior to onward transmission to a user.

The designated router may be configured remotely via the communications network, the designated interface, or via a control port of lower data rate than the interfaces. Said control port may for example provide a command line interface (CLI).

According to another aspect of the present invention there is provided a probe apparatus for use in monitoring a communications network, the probe apparatus being adapted for connection to an interface of a label switching router working within said network and comprising means for configuring said router to perform multicast forwarding of selected data to said interface.

The probe apparatus may contain a look-up table, cross-referencing a label identifier to a label switched path being monitored.

The probe apparatus may include means for establishing an alerting function within the router to detect and respond to LSP/tunnel association changes. The alerting function may be established in the form of an MIB trap.

The advantages provided by the features presented in the preceding paragraphs are that multiple label switched paths are selectively monitored in a physically less intrusive manner by a minimal number of probes. Also, that the solution is not tied to any particular protocol, is scalable and that the data collected by a probe is selectively aggregated to remove superfluous data prior to onward transmission to its consumer, such as the network manager.

In the preferred embodiments, the probe works in co-operation with the router, configuring the router to perform the desired monitoring and ensuring that the router/probe combination continues to monitor desired traffic being carried by changing virtual paths, by dynamically responding to changes in their routing. This would not be practical with tapping of physical interfaces and less simple with current methods for virtual monitoring, such as using a SPAN port.

BRIEF DESCRIPTION OF THE DRAWINGS

Embodiments of the invention will now be described, by way of example only, by reference to the accompanying drawings, in which:

FIG. 1 is a generalised block diagram of a communications network comprising a number of Label Switching Routers within an LSR cloud;

FIG. 2 shows the reduction in network traffic achieved by using multicast broadcasting, when compared to using traditional point-to-point transmission;

DETAILED DESCRIPTION OF THE EMBODIMENTS

Figures 3, 4:
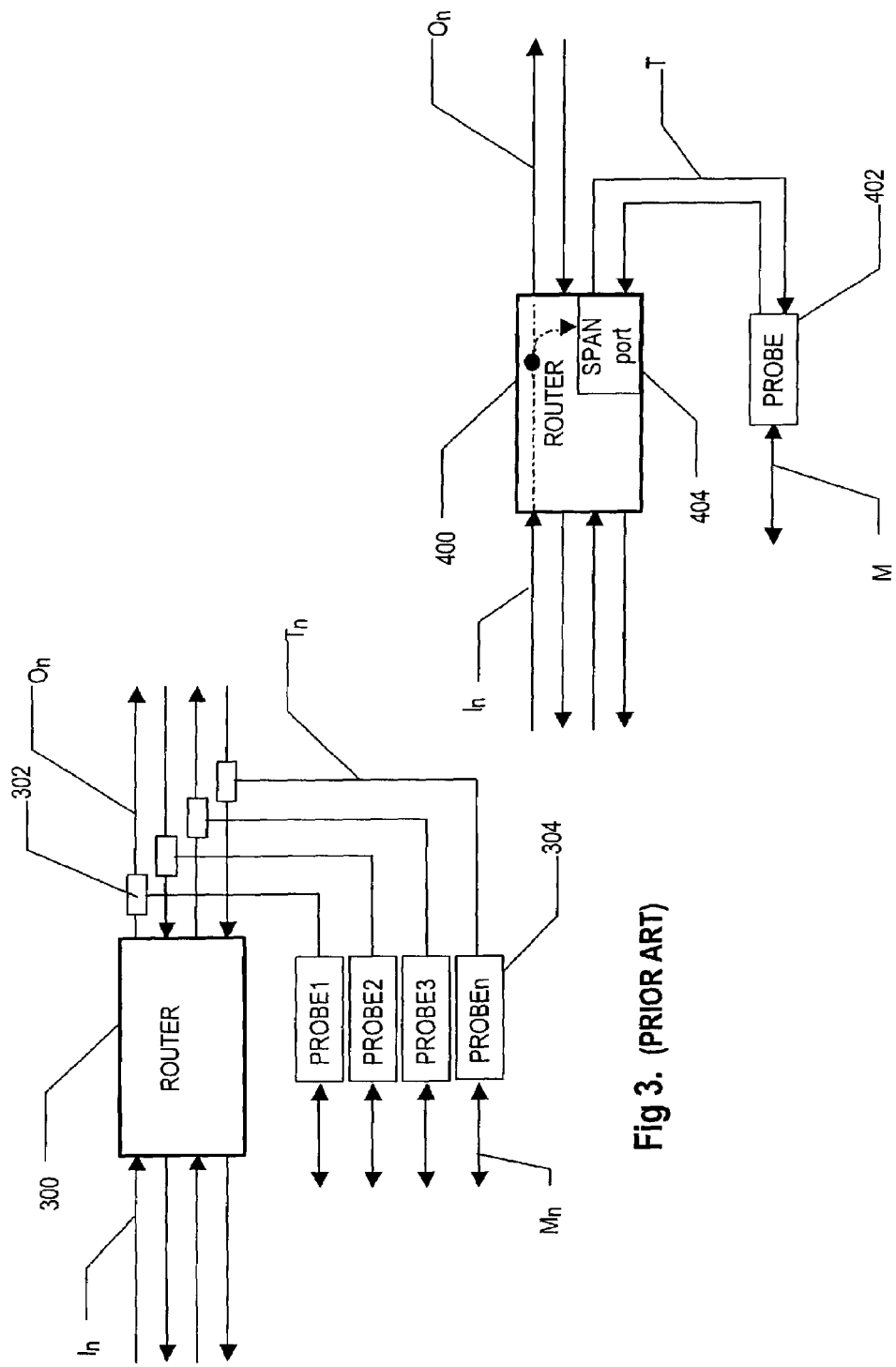
FIG. 3 shows a known apparatus for monitoring using optical splitters to tap physical links in a communications network.
FIG. 4 shows an alternative known monitoring method, by the use of a SPAN port on a router.

This invention is not specifically limited to embodiment in either hardware or software. The following description is generally valid for either implementation, special differences being pointed out as required. The mixture of hardware and software, which is used in a given application will depend on many factors familiar to the skilled person. Such factors include the bandwidth of the network, the complexity of the monitoring tasks, the suitability of the hardware available at the time for the tasks required, the relative development costs of the different solutions, and the expected scale of production.

Background to Label Switching

FIG. 1 shows a small label switching communications network comprising Label Switching Routers LSR1 101, LSR2 102, LSR3 103 & LSR4 104, interconnected by physical links (not shown explicitly in the diagram) that carry virtual links known as Label Switched Paths (LSPs) LSP1, LSP2. A collection of LSRs and links is known as an 'LSR cloud' 106, the outer peripheries of which are the points at which traffic receives additional tagging to facilitate label switching. Each LSP has an "ingress" where it enters, respectively, and traverses the cloud in a series of "hops" from router to router until it reaches an "egress" and leaves the cloud. Network traffic passing through an LSP, and therefore within the boundaries of an LSR cloud, is identified to the routers through which it passes by labels 110, 118 etc attached to the traffic by the ingress router and modified as it traverses the cloud. The number of routers and links shown in FIG. 1 is very small. In a practical implementation, the routers will be more numerous and each will have tens or hundreds of input/output links connectable to neighbouring nodes in the network.

The operation of label switched routing in the network of FIG. 1 will now be described briefly as background. Selecting LSP2 as an example, data packets are passed (at least at the time being illustrated) from its ingress at LSR4 104 via LSR3 103 to its subsequent egress at LSR1 101. Each data packet 112 comprising payload 114 and header 116, enters the ingress point of LSP2 at LSR4, from which it is sent to LSR3 with a label "L9" 110. Label L9 is unique to this LSP within the link from LSR4 to LSR3. Each LSP may share a physical link with other LSPs between the same routers. The traffic with label L9 is routed by LSR3 to LSR1 with a different label L7 118, which is unique to LSP2 on the link between LSR3 and LSR1. LSR1 represents the outgoing boundary of the LSR cloud for LSP2, from which the traffic emerges with its associated label removed, restored to its configuration prior to entering the LSR cloud. In a similar manner, data forming LSP1 enters the cloud at LSR2 and passes to LSR3, and then to LSR4 where it finds its egress. At each link between routers, labels L8 then L3 are attached, which uniquely identify LSP1 on a given physical link. Although labels L3, L7, L8 and L9 are distinguishable in the example, those labels might, by coincidence all have the same value, but have a different meaning in the context of their respective physical links.

Again referring to FIG. 1, the routers are configured to perform label switching in a pre-emptive manner, that is, in advance of the ingress router receiving the label switched data. Specific LSP configuration protocols, such as RSVP-TE or CR-LDP, are used by way of dedicated configuration packets to create the Label Switching Paths LSP1, LSP2 within the LSR cloud and work, generally, as described below. From the ingress point onwards, each router is configured to form a label switched path (LSP) for that traffic, taking into consideration any routing constraints specified by the associated LSP configuration packets. In the example of LSP2 whose ingress point is at LSR4 104, LSR4 communicates with the next hop router, in this case LSR3 103, and provided that it is an LSR (which it is in this limited case), it creates a forward hop by assigning a label 110 unique to that hop. This repeats until an LSR can no longer form an LSP with the next hop forward router (in this example LSR1 101), at which point the LSRs associated with the LSP communicate backward up the path, configuring each LSR with the label-to-hop assignment relationship for that particular LSP, until the source of the LSP is reached. At this point a valid LSP, in this case LSP2, has been created across a multiplicity of label switching routers, LSR4-LSR3-LSR1. Traffic enters the LSP at its appropriate ingress and exits at its egress. Traffic is then routed across the LSP purely by the label identifiers associated with a piece of data and how it correlates with a map held in each LSR for each hop.

Label switching provides a number of advantages when compared with traditional routing methods. For example, much less complex hardware is required to achieve the same traffic throughput as a) the protocol of each piece of data does not need to be interpreted and b) only one, relatively simple, routing algorithm is required to facilitate data transfer. The bulk of the routing effort has been achieved by the pre-emptive configuration of maps in every LSR that the data will pass through, prior to transmission of the data itself. Furthermore, label switching offers more control over the route taken by the packet, enabling better support for Quality of Service/traffic engineering, rather than the best-effort routing of a traditional network.

As communication networks evolve (for example, the use of the internet), there is a growing need to distribute the same data from a point source, that is "broadcasting", to a number of destinations.

FIG. 2(*a*) shows the traditional method for broadcasting data from a single point source 200 (designated node A) by simply routing the same data to each destination as if there were no other destinations. In this example there exist five destination nodes C, D, G, H, I on distribution tree headed by router B. Data source 200 therefore transmits five copies 202 of the same data to each destination node, resulting in router B having to switch the very same data five times. The data is passed to nodes E, F and J by point-to-point routing. The method by which the identical data is broadcast to the destination nodes is the same method used for distributing unlike data and as such is particularly inefficient, due to the duplications involved. To overcome this inefficiency in broadcast applications, multicast routing was devised. When multicasting is employed the source data is transmitted the minimum number of times to pass it to its destination. In the example shown in the modified diagram of FIG. 2(*b*) this amounts to only nine times, compared with the fourteen times the traditional methods previously described (the skilled reader will appreciate the savings made when scaled up to the size of a more realistic network). Each router that can perform multicasting has to have the intelligence to forward the data on to the next hop without the inefficient duplication, that is to be aware of, and be capable of, operating with a distribution tree, as shown in the example of the right hand diagram of FIG. 2. A router that is capable of multicasting a single entity to multiple destinations is known as a "multicast router". There exist a variety of multicast protocols for the differing network standards, that can be used in broadcasting and also in implementation of the novel technique to be described below.

Monitoring-Background

Potential problems encountered in modem network operations can include high bit error rates (resulting in the need for frequent retransmission, increasing the quantity of traffic the network has to transport), poor application or data retrieval times, general latency problems, loss of data or lack of bandwidth capacity. These can arise from a variety of different sources such as the architecture of the network, inadequate bandwidth allocation, usage patterns or component failure. In order to operate the network at its optimum availability monitoring systems are required to find the cause of such problems. In addition to semi-permanent monitoring for trouble-shooting, permanent monitoring systems are employed to administer the smooth operation of a network and to ensure that accurate, verifiable billing is provided to all customers. The correct operation of both the networks and their monitoring systems has to be routinely verified by the use of temporarily deployed monitoring and testing systems.

The following descriptions of network monitoring problems describe how monitoring is conventionally performed in such networks. It will then be described how multicast routers can be used to provide an improved non-invasive method for data stream monitoring which is capable of providing simultaneous monitoring of specific data of interest and, if required, the aggregation of the data monitored to reduce the amount of data sent to the consumer of said data.

FIG. 3 illustrates the most direct approach for monitoring network traffic, by the deployment of a probe physically tapping into the optical communication link itself. The traffic of interest is monitored as it exits router 300 by inserting a tap 302 (optical splitter) into each line $O_n$ etc. The tapped signal is passed to a probe 304 for processing and reporting to the network management recipient via interface $M_n$. This method, however, has many disadvantages. Insertion of a tap 302 in-line attenuates the signal, increasing the likelihood of transmission errors, and costly down-time is required for each insertion. Also, one may not be able to predict in advance which interfaces need to be tapped. In the particular case of Multi-Protocol Label Switching (MPLS), as described earlier, one may be primarily interested in monitoring traffic trunks or "tunnels" where it is possible for traffic associated with a particular tunnel to be load-balanced over multiple LSPs and also split over multiple physical interfaces, resulting in having to monitor and filter many interfaces simultaneously to extract the packets required. Furthermore, the path taken by an LSP may vary over time due to events such as link failure and path re-optimisation, such that packets carried across an LSP switch physical interfaces, resulting in having to track the LSP as it jumps about. These examples show that in the extreme case one may need to attach optical splitters to every link leaving a router, and for large core routers there may be a very large number of interfaces involved, resulting in problems of physical scaling when wanting to deploy a probe or tap for each router interface.

FIG. 4 illustrates an alternative known solution, using a dedicated device called a SPAN (Switched Port ANalyser) port built into the router. The SPAN port solution monitors the data flowing through a router 400 by connecting a probe 402 to the dedicated router port 404 whereby copies of packets sent over a router's selected physical interface, for example $O_n$, are sent to the router port 402 for passing to the probe 404 and onward transmission, as before. The probe is attached to a single, dedicated physical interface (port) without disrupting any of the interfaces that are involved in routing traffic, one of which the port is thereafter dynamically selected to monitor. Although the SPAN port approach significantly reduces the physical disruption to the router environment that the first solution exhibited, however, it becomes unsuitable as soon as one wishes to observe a subset of packets from multiple interfaces—only a single interface can be observed at any point in time. Furthermore, the probe 402 must be capable of handling packets at speeds dictated by the fastest router interface to be monitored, even if the packet rates on a virtual path of interest being carried by the physical interface being monitored is substantially smaller than this. For example, a 1 Gbps SPAN port would be necessary to monitor a virtual path with a bandwidth of only 2 Mbps but being carried on a 1 Gbps router interface.

Monitoring by Multicast Routing

FIG. 5 shows again the Label Switching Network of FIG. 1, comprising the same Label Switching Routers 101–104 forming an LSR cloud. At least LSR3 103 in this example is a multicast LSR, capable of multicast broadcasting of identical data, as described previously with reference to FIG. 2. Multicast router 103 has been selected for use in monitoring of certain LSPs passing through it. A monitoring apparatus referred to as a probe 504 has been connected to LSR3 103 via interface 506, which is one of the router's normal ports but selected as the target for monitored data. Router LSR3 103 in particular must be capable of multicasting label switched data, whereas the other routers within the LSR cloud need only be capable of label switching.

Multicasting of label switched data is exploited to monitor the desired data streams across a network. LSR3 103 is configured to perform a multicast on the desired data for monitoring purposes, rather than for broadcast purposes. In this case only one router is being configured to perform multicasting. In the example cases of LSP1 and LSP2, LSR3 103 is configured to multicast copies 510 of data streams LSP1 and LSP2 to the probe 504. It may be necessary on an older installation to swap an existing router for one with multicast capability. In general however, multicast-capable routers will increasingly be the norm and the monitoring can be undertaken with no physical disruption to the network, attracting only the minor expense of managing an overhead of a very small proportion of monitoring traffic with respect to the volume of traffic being conveyed by the network itself.

In further detail, when LSR3 103 receives a labelled packet 508 it finds the Next Hop Label Forwarding Entry (NHLFE) associated with the incoming label. The NHLFE contains details of the packet's next hop together with the operation to perform on the packet's label, typically label replacement. However, for the purposes of monitoring, the router will have been configured such that multiple NHLFEs become associated with the incoming label. Multicast entries are then established appropriate for those LSPs to be monitored (in this example LSP1 and LSP2). Copies of any packets sent over these LSPs are then copied to the selected interface 506, to which the probe 504 attaches. Furthermore, LSR 3 can be configured to arrange for packets from each monitored LSP to have distinct labels such as L1, L2 when sent to the interface 506, allowing the probe to distinguish packets from different sources by reference to an onboard look-up table (or map) that cross-references labels to the LSPs or tunnels being monitored. If the amount of LSPs being monitored exceeds the capacity of the interface to which the probe attaches (or the probe itself) then more than one interface and respective probe can be used, balancing the load across the interfaces.

Protocols for remote monitoring and use of the Management Information Base (MIB) have been defined by The Internet Society among others, by which "MIB agents" within each router can be configured by an "MIB client". The supportive literature is being constantly updated by improvements or amendments, some current relevant examples of such being Internet Society Network Working Group document RFC 2819 by S. Waldbusser (Lucent Technologies), May 2000, document "draft-ietf-mpls-lsr-mib-07.txt", January 2001, and document "draft-ietf-mpls-ftn-mib-01.txt", April 2001. A full and current list of appropriate references can be found at http://www.ietf.org/ietf/lid-abstracts.txt. The MIB specification responsible for establishing multicast LSP entries can be extended to incorporate the novel functionality in a manner that will be apparent to the skilled reader.

Probe 504 is designed to provide data processing. Examples of such are data sampling, particular testing to be performed on each packet received or selectively aggregating the data prior to onward transmission to the monitoring system, so that the quantity of data M transmitted to the management station is considerably less than the quantity of actual data 510 being received by the probe. For example, one might wish to monitor traffic matching a specified packet profile, or packets associated with one or more label switched paths or tunnels, but only require reports on the statistics of the monitored traffic (total data rate, regularity of packets, etc.), or specific events within the data stream.

In many cases one may wish to monitor a traffic trunk, or tunnel, rather than an individual LSP. At any instant in time the router may use a particular LSP to carry traffic associated with the tunnel, but a succession of LSPs may be used at different times due to for example tunnel pre-emption or link failure. In such cases to be able to continue to track the traffic of interest the probe 504 needs to know when an LSP/tunnel association changes. The probe will not be able to determine this by observing the signalling traffic if signalling traffic is not multicast to the probe interface 506. To overcome this, router LSR3 103 informs the probe of the comparatively rare LSP/tunnel association changes by using an MIB trap mechanism. Each time the probe is informed of such a change it replaces in its look-up table the old multicast entries with new ones for the replacement LSPs. After a brief interruption, data is monitored as before.

The interface 506 to which the probe attaches may also be used as the medium over which the probe is configured from a remote management station, using protocols such as the well known SNMP protocol. If LSR3 103 allows multicast entries to be established via an MIB then the same interface is also used by the probe 504 to configure the router to perform the necessary multicasting. However, in some cases the required establishment of a degenerate multicast entry for monitoring purposes may require access to the router's command-line interface, potentially requiring an additional low-speed connection from the probe to the router's CLI port 502.

Attaching a probe 504 to a router 103 using the multicast approach is considerably less physically intrusive than a tap-based solution. The most obvious disadvantage of the multicast approach is its potential effect on router performance, whereby each multicast packet requires additional router resources to forward it. However, if one is monitoring only a comparatively small number of LSPs at any instant in time then the percentage overhead may be quite negligible. The overhead incurred also depends on the router architecture. In high-speed routers, where much of the packet forwarding effort is distributed across the line cards, the additional overhead of forwarding packets to an additional interface may also be negligible. Another disadvantage is that each router port has its own output queue, so that the original data and the copy for monitoring are not guaranteed to emerge from the router at precisely the same instant. For some monitoring tasks, therefore, a physical tap may be the only option. For most tasks, however, the advantages provided by the novel technique clearly outweigh the disadvantages.

Figure 6:
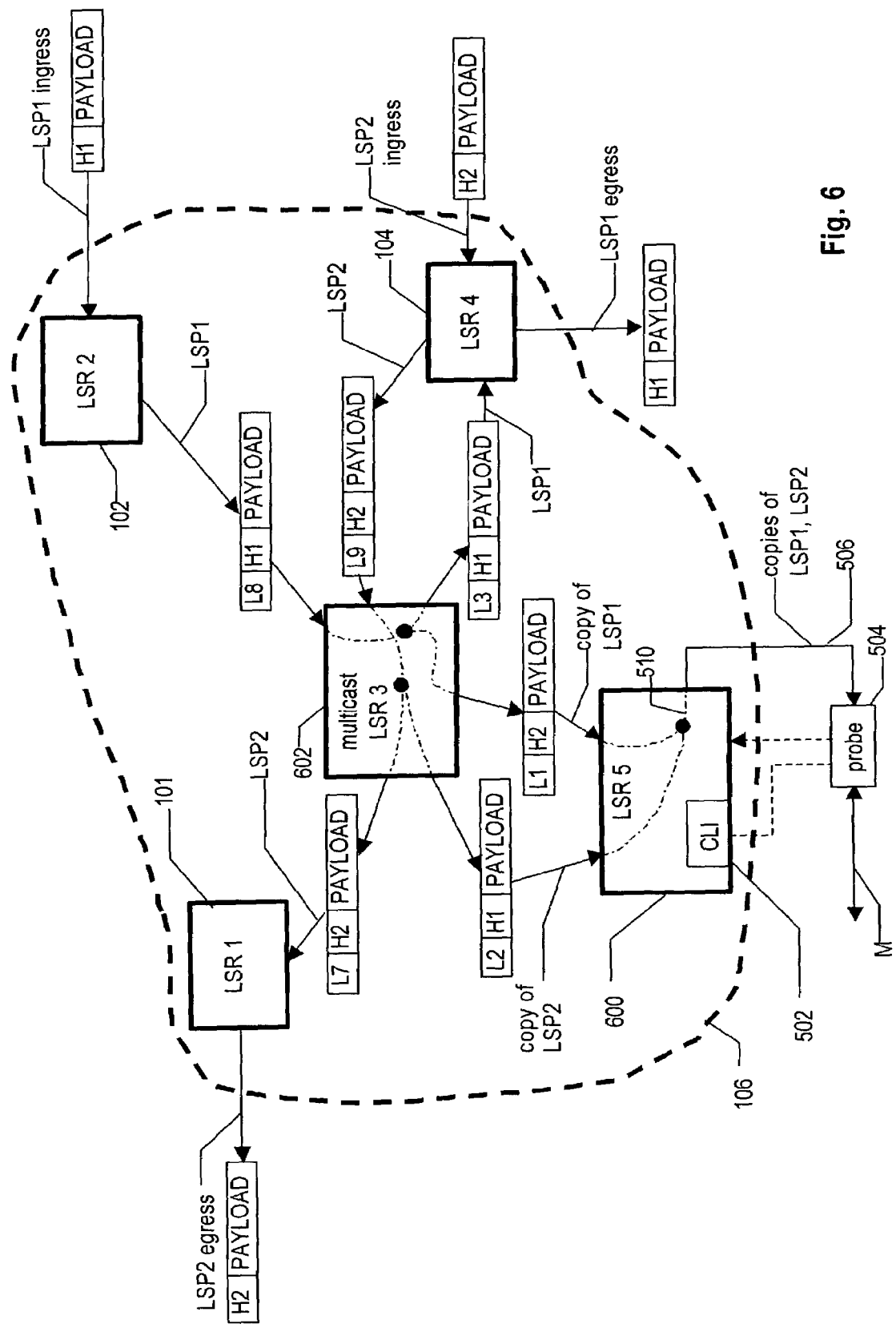
FIG. 6 illustrates an embodiment in which the probe is physically remote from the multicast router and the copies of the data of interest are sent over the communications network.

FIG. 6 shows an alternative method for network data stream monitoring, wherein instead of being physically attached to the multicast router, the probe is physically remote from the router and the copies of the data of interest are sent over the communications network.

Figure 5:
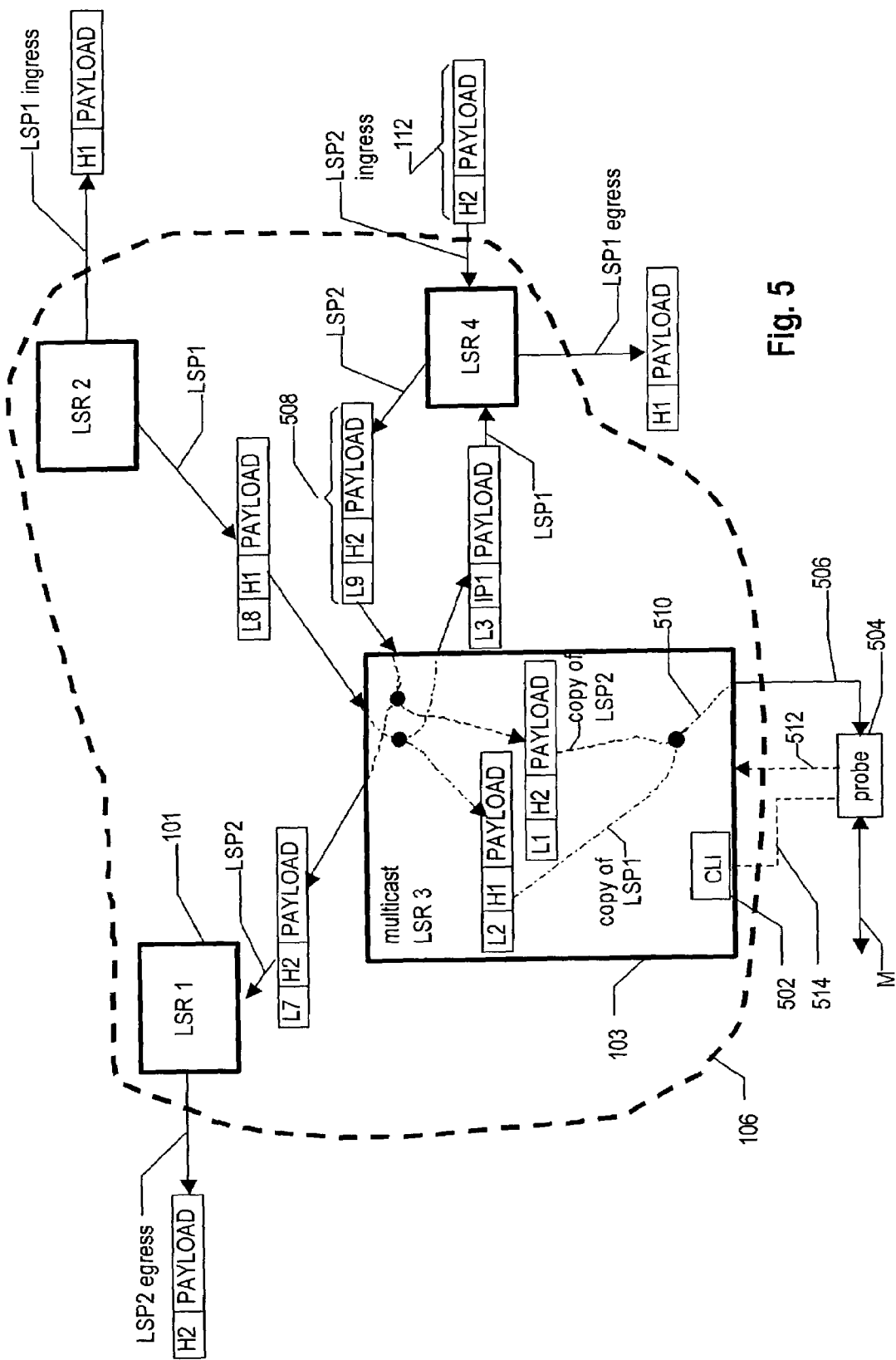
FIG. 5 is a block diagram of the same network as is shown in FIG. 1, wherein monitoring is achieved by configuring a multicast router to copy traffic of interest to a non-invasive probe attached to said router, in accordance with the present invention.

Router LSR5 600 (which does not have to be a multicast router) with selected target probe interface 504 is physically remote from multicast router LSR3 602 that is multicast broadcasting the data being monitored. The only difference between this and the previous embodiment shown in FIG. 5 is that the copied traffic is transmitted between the multicast router 602 and the probe interface router 600 before being output to the probe 504 for aggregation and subsequent forwarding to the network managers, as before. This is clearly less efficient on bandwidth, as unaggregated data is having to be transmitted between routers 602 and 600, but it provides added flexibility by removing the constraint of having to physically co-locate the multicast router 602 with the probe 504. Timing differences between the monitored data and the copy data will become larger with each hop, of course, and the user will have to decide to what extent this devalues the monitoring results, bearing in mind the purpose of the monitoring. On the other hand, multiple paths can be copied to the same probe from different routers within the cloud.

Those skilled in the art will appreciate that the embodiments described above are not restricted to "single-point" monitoring, but apply also to multi-point monitoring of comparison data such as for delay and loss measurement, requiring the same data to be monitored at physically different points throughout the network.

Furthermore, those skilled in the art will appreciate that the embodiments described above are presented by way of example only, and that many further modifications and variations are possible within the spirit and scope of the invention.

The invention claimed is:

1. A method for the monitoring of selected data among other data passing through label switched paths of a communications network, the network comprising a plurality of label switching routers, each router having a plurality of interfaces connected to other routers by means of physical links, each router to forwards incoming data packets toward respective destinations in the network by reference to labels received with said data packets, the method comprising the following steps:
   designating at least one of the routers as a monitoring station;
   designating at least one of the routers as a probe interface station, and designating as a probe interface an output interface of said router;
   connecting a probe apparatus to receive data from the probe interface;
   configuring the designated monitoring station by means of a multicast function within the router to forward the selected data additionally to the probe interface; and
   operating said probe apparatus so as to monitor the selected data as it is received from said probe interface.

2. A method of monitoring as claimed in claim 1, wherein a single designated router serves as both said monitoring station and said probe interface station.

3. A method of monitoring as claimed in claim 1, wherein said monitoring station and said probe interface station are served by separate designated routers.

4. A method of monitoring as claimed in claim 1, wherein said designated interface comprises one of many interfaces ordinarily provided on said router, rather than a port dedicated to monitoring at the time of manufacture.

5. A method of monitoring as claimed in claim 1, wherein said selected data is designated by reference to a specific label switched path (LSP) identifier, said designated router then translating the LSP identifier to a specific incoming label to establish the multicasting.

6. A method of monitoring as claimed in claim 1, wherein said probe apparatus and said designated router are reconfigured automatically in response to LSP/tunnel association changes.

7. A method of monitoring as claimed in claim 6, wherein said automatic reconfiguration is arranged via an alerting function established within said designated router.

8. A method of monitoring as claimed in claim 1, wherein said designated router is to forwards said selected data to said probe apparatus with different labels so as to distinguish between data from different sources.

9. A method of monitoring as claimed in claim 1, wherein said monitoring step includes aggregation of said selected data sent to said probe apparatus prior to onward transmission to a user.

10. A method of monitoring as claimed in claim 1, wherein said designated router is configured remotely via said communications network.

11. A method of monitoring as claimed in claim 1, wherein said designated router is configured remotely via said designated probe interface.

12. A method of monitoring as claimed in claim 1, wherein said designated router is configured remotely via a control port of lower data rate than said interfaces.

* * * * *